(12) United States Patent
McLoughlin et al.

(10) Patent No.: US 12,325,764 B2
(45) Date of Patent: Jun. 10, 2025

(54) PROPYLENE POLYMER RESINS

(71) Applicant: Braskem America, Inc., Philadelphia, PA (US)

(72) Inventors: Kimberly Miller McLoughlin, Pittsburgh, PA (US); Rodney Peratt, Pittsburgh, PA (US); Craig Meverden, Pittsburgh, PA (US); Michael Stephans, Pittsburgh, PA (US)

(73) Assignee: Braskem America, Inc., Philadelphia, PA (US)

( * ) Notice: Subject to any disclaimer, the term of this patent is extended or adjusted under 35 U.S.C. 154(b) by 187 days.

(21) Appl. No.: 18/207,416

(22) Filed: Jun. 8, 2023

(65) Prior Publication Data

US 2023/0312783 A1 Oct. 5, 2023

Related U.S. Application Data

(62) Division of application No. 14/773,131, filed as application No. PCT/US2014/027625 on Mar. 14, 2014, now abandoned.

(60) Provisional application No. 61/791,986, filed on Mar. 15, 2013.

(51) Int. Cl.
| | |
|---|---|
| C08F 110/06 | (2006.01) |
| B29C 51/02 | (2006.01) |
| B29K 23/00 | (2006.01) |
| C08F 2/01 | (2006.01) |
| C08F 10/06 | (2006.01) |
| C08J 5/18 | (2006.01) |

(52) U.S. Cl.
CPC .............. *C08F 110/06* (2013.01); *C08F 2/01* (2013.01); *C08F 10/06* (2013.01); *C08J 5/18* (2013.01); *B29C 51/02* (2013.01); *B29K 2023/10* (2013.01); *C08J 2327/12* (2013.01)

(58) Field of Classification Search
CPC ....... B29C 48/07; B29C 44/505; B29C 63/00; B29C 59/06; B29C 51/426; B29C 51/421; B29C 51/105; B29C 48/0017; C08J 5/18; C08F 10/06; C08F 2/01; C08F 110/06
See application file for complete search history.

(56) References Cited

U.S. PATENT DOCUMENTS

| | | | |
|---|---|---|---|
| 5,266,607 A | 11/1993 | Lucas et al. | |
| 6,090,325 A | 7/2000 | Wheat et al. | |
| 6,136,937 A | 10/2000 | Lai et al. | |
| 7,189,788 B2 | 3/2007 | Machida et al. | |
| 7,465,776 B2 | 12/2008 | Meverden et al. | |
| 7,473,463 B2 | 1/2009 | Wolfschwenger et al. | |
| 7,662,901 B2 | 2/2010 | Meverden et al. | |
| 8,389,635 B2 | 3/2013 | Doufas | |
| 8,765,851 B2 | 7/2014 | Miller et al. | |
| 2007/0203298 A1 | 8/2007 | Massari et al. | |
| 2007/0265403 A1 | 11/2007 | Blackmon et al. | |
| 2008/0042323 A1 | 2/2008 | Inukai et al. | |
| 2012/0288656 A1 | 11/2012 | Doufas | |

FOREIGN PATENT DOCUMENTS

| | | |
|---|---|---|
| JP | 2004175932 A1 | 6/2004 |
| JP | 2009057473 A | 3/2009 |
| WO | 2004013193 A2 | 2/2004 |
| WO | 2013004507 A1 | 1/2013 |

OTHER PUBLICATIONS

Ghijsels et al., "Melt Strength Behaviour of Polypropylene", Hanser Publishers (1994), 3, pp. 252-257.
Lau et al., "Melt Strength of Polypropylene: Its Relevance to Thermoforming", Polymer Engineering and Science (1998), 38(11), pp. 1915-1923.
Muke et al., "Extensional theology of polypropylene melts from the Rheotens test", J. Non-Newtonian Fluid Mech. (2001), 101, pp. 77-93.
Viville et al., "Characterization of the molecular structure of two highly isotactic polypropylenes", Polymer (2001), 42, pp. 1953-1967.
Polypropylene Handbook, 2nd Edition, Nello Pasquini, ed., 2005, pp. 312-315.
ASTM D4440-08, "Standard Test Method for Plastics: Dynamic Mechanical Properties Melt Rheology", ASTM International (2008), 5 pages.
ASTM D5492-10, "Standard Test Method for Determination of Xylene Solubles in Propylene Plastics", ASTM International (2010), https://compass.astm.org/download/D5492-10.8719.pdf.
FlexPac.com (https://www.flexp.com/cast-and-blown/), published May 23, 2012.
Malpass et al., "Introduction to Industrial Polypropylene, Properties, Catalysts, Processes", Wiley, Scrivener Publishing LLC (Jun. 18, 2012), 4 pages.
International Search Report and Written Opinion of the International Searching Authority for International Application No. PCT/US2014/027625 mailed Jul. 30, 2014.
International Preliminary Report on Patentability for International Application No. PCT/US2014/027625 issued Sep. 15, 2015.

*Primary Examiner* — Stella K Yi
(74) *Attorney, Agent, or Firm* — Jeffrey N. Townes; Cozen O'Connor

(57) ABSTRACT

Propylene-based polymer resins and related compositions and processes are disclosed. The propylene polymer resins have high isotacticity and moderately high xylene soluble content. The polymer resins provide extruded sheets suitable for thermo forming that exhibit both sag resistance and ease of draw.

23 Claims, No Drawings

PROPYLENE POLYMER RESINS

CROSS-REFERENCE TO RELATED APPLICATIONS

This application is Divisional of U.S. patent application Ser. No. 14/773,131, filed Sep. 4, 2015, which is a U.S. National Stage application under 35 U.S.C. 371 and claims priority to International Patent Application No. PCT/US2014/027625, filed on Mar. 14, 2014, entitled PROPYLENE POLYMER RESINS, which application, pursuant to 35 U.S.C. § 119 (e), claims priority to U.S. Provisional Patent Application No. 61/791,986, filed on Mar. 15, 2013. The disclosures of which are herein incorporated by reference.

BACKGROUND

Synthetic polymeric materials such as propylene-based polymer resins are widely used in the production of bulk materials, such as thermoplastic sheets, films, and pellets, which are used for the manufacture of a variety of end-use products such as medical devices and food containers. Many industries, such as the packaging and container industry, utilize propylene-based polymer materials like thermoplastic sheets, films, and pellets in various manufacturing processes, such as extrusion, thermoforming, and injection molding, to create a variety of products.

TECHNICAL FIELD

This specification generally relates to propylene-based polymer resins having improved properties such as, for example, sag resistance and shear thinning in thermoforming processes. This specification also generally relates to compositions comprising propylene-based polymer resins and to processes for the production and use of propylene-based polymer resins.

The polymers described herein, have an onset frequency for shear thinning much lower than standard propylene-based polymers. Therefore, the polymers demonstrate improved processability during the extrusion step of thermoforming or other processes to produce packages or containers. The polymer described herein flow easily under lower than usual pressure and require substantially less energy to process.

SUMMARY

In a non-limiting embodiment, a propylene polymer resin comprises a xylene soluble content greater than 2, and a mesopentad content in the xylene-insoluble fraction greater than 93.5. An article of manufacture may comprise the propylene polymer resin.

In another non-limiting embodiment, a composition comprises a propylene polymer resin. The propylene polymer resin has a melt flow rate greater than 0.4 gram per 10 minutes, $M_w/M_n$, greater than 5.5, $M_z/M_n$ greater than 20, a critical frequency for onset of shear-thinning, 1/K, less than 1.2 s$^{-1}$ where K is a Cross model constant, a melt strength greater than 15 cN at 190° C., xylene soluble content greater than 2, and mesopentad content in the xylene-insoluble fraction greater than 93.5% mmmm.

In another non-limiting embodiment, an extruded sheet comprises a propylene polymer resin. The propylene polymer resin has a melt flow rate greater than 0.4 gram per 10 minutes, $M_w/M_n$, greater than 5.5, $M_z/M_n$ greater than 20, a critical frequency for onset of shear-thinning, 1/K, less than 1.2 s$^{-1}$ where K is a Cross model constant, a melt strength greater than 15 cN at 190° C., xylene soluble content greater than 2, and mesopentad content in the xylene-insoluble fraction greater than 93.5% mmmm.

In another non-limiting embodiment, a thermoforming process comprises extruding a sheet. The sheet comprises a propylene polymer resin. The propylene polymer resin has a melt flow rate greater than 0.4 gram per 10 minutes, $M_w/M_n$ greater than 5.5, $M_z/M_n$ greater than 20, a critical frequency for onset of shear-thinning, 1/K, less than 1.2 s$^{-1}$ where K is a Cross model constant, a melt strength greater than 15 cN at 190° C., xylene soluble content greater than 2, and mesopentad content in the xylene-insoluble fraction greater than 93.5% mmmm.

In another non-limiting embodiment, an extruded sheet is heated to a temperature of at least 290° C. The sheet is positioned above a vacuum mold. A vacuum pressure of 2,241.0 kilopascals (325.0 pounds-per-square inch) or less is applied to the sheet to draw the sheet into the mold, thereby thermoforming an article in the shape of the mold.

It is understood that the invention disclosed and described in this specification is not limited to the embodiments summarized in this Summary.

DESCRIPTION

Various embodiments are described and illustrated in this specification to provide an overall understanding of the composition, properties, and use of the disclosed propylene polymer compositions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. § 112, first paragraph, and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

In this specification, other than where otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in this specification should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112, first paragraph, and 35 U.S.C. § 132(a).

The grammatical articles "one," "a," "an," and "the," as used in this specification, are intended to include "at least one" or "one or more," unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

The following definitions and analytical methods are used in this specification:

The term "polymer," as used herein, refers to a polymeric compound prepared by polymerizing monomers, whether of the same or a different type. The generic term polymer thus embraces the term "homopolymer," usually employed to refer to polymers prepared from only one type of monomer; "copolymer," which refers to polymers prepared from two or more different monomers; and blends of polymers, which are compositions comprising two or more polymers that have different polymeric structures.

"Propylene polymer," as used herein, shall mean polymer comprising greater than 50% by weight per molecule of monomeric units derived from propylene monomer. This includes polypropylene homopolymers or copolymers (meaning units derived from two or more comonomers), as well as blends of polymers where polypropylene is the matrix phase of the blend. "Propylene polymer resin," as used herein, shall mean a macroscopic mass of material comprising a plurality of propylene polymer molecules, as opposed to the individual microscopic polymer molecules.

As used herein, the term "alpha-olefin" or "α-olefin" includes alkenes having a carbon-carbon double bond between the first and second carbon atom. Examples of alpha-olefins include, but are not limited to ethylene, propylene, 1-butene, 1-pentene, 1-hexene, 1-heptene, 1-octene, 1-nonene, 1-decene, 1-undecene, and 1-dodecene, including combinations of any thereof.

As used herein, "melt flow rate" (also referred to as "MFR") is determined according to ASTM D1238-10 (230° C., 2.16 kg): Standard Test Method for Melt Flow Rates of Thermoplastics by Extrusion Plastometer. Melt flow rates are reported in units of grams-per-10-minutes (g/10 min) or decigrams-per-minute (dg/min).

As used herein, "meso pentad" refers to five successive methyl groups located on the same side of the plane of the carbon-carbon chain in a propylene polymer molecule (mmmm, wherein "m" represents a meso dyad, i.e., two successive methyl groups located on the same side of the plane of the carbon-carbon chain). As used herein, "meso pentad content" refers to the percentage of meso pentad units (mmmm) in propylene polymer resins as measured from signals of methyl groups in $^{13}$C-NMR spectra according to the method described in Zambelli et al., *Macromolecules,* 6, 925 (1973), wherein the measurement of $^{13}$C-NMR spectra is conducted according to the peak attribution method described in Zambelli et al., *Macromolecules,* 8, 687 (1975) (both references are incorporated by reference into this specification). A meso pentad content of 100% corresponds to a completely isotactic polymer resin and the closer the meso pentad content is to 100%, the higher the stereoregularity (i.e., isotacticity) of the polymer resin.

As used herein, "$M_w/M_n$" refers to the ratio of the weight average molecular mass to the number average molecular mass of a polymer resin. "$M_w/M_n$" is also known as the polydispersity index (PDI) of a polymer resin, and is a measure of the molecular weight distribution of the resin. "$M_z/M_n$" refers to the ratio of the z-average molecular mass to the number average molecular mass of a polymer resin. "$M_z/M_n$" is a measure of the molecular weight distribution of a polymer resin. "$M_z/M_w$" refers to the ratio of the z-average molecular mass to the weight average molecular mass of a polymer resin. "$M_z/M_w$" is a measure of the molecular weight distribution of a polymer resin. The molecular weight distributions of a polymer resin may be determined using methods such as high-temperature size exclusion chromatography (HSEC).

As used herein, "xylene solubles" refers to the weight fraction or percentage of a polymer resin that is soluble in xylene solvent as measured according to ASTM D5492-10: Standard Test Method for Determination of Xylene Solubles in Propylene Plastics.

As used herein, "sheet sag" is defined as the difference in height between the supported sheet edges and the center of an extruded sheet, where the sheet is supported at the edges by clamps that constrain it as it advances along fixed rails. Sheet sag is a problem in thermoforming processes. When sheets are heated to temperatures suitable for forming, they can sag at the center. This can create a problem because a sheet has the potential to sag against and contact the heating elements in a thermoforming oven, which may ignite the sheet material.

As used herein, "sag per unit area" or "sag unit area" is defined as sag in inches divided by the product of sheet thickness and the width of the sheet as it is extruded from a die.

As used herein, "shear thinning" is generally demonstrated by oscillatory stress to show that viscosity decreases as frequency of applied stress increases.

Thermoforming is a process comprising heating a thermoplastic material to a workable temperature, typically slightly below the material's melting point temperature, and then vacuum or pressure forming the material into a desired shape in a mold. Thermoforming processes may be used to produce articles such as, for example, drinking cups, storage containers, and the like, from extruded propylene polymer resins.

During the heating step it is highly desirable to reach a uniform temperature distribution across the sheet or film of thermoplastic material in order to achieve a more uniform distribution of material in the part to be produced. Heating the thermoplastic material, however, tends to cause the material to sag under the influence of gravity. This tendency is known as thermoforming sag. The extent of thermoforming sag is an important parameter as it controls the "window of operation" for the thermoforming process. In other words, the tendency of the thermoplastic material to sag when heated limits the time available to achieve a uniform temperature distribution across the sheet and, therefore, limits the time/temperature window of operation.

The incorporation of high molecular weight polymer molecules into propylene polymer resins is one way to improve resistance to thermoforming sag. However, the incorporation of high molecular weight polymer molecules may cause an increase in melt viscosity and a decrease in melt flow rate, which may result in resins that are incompatible with thermoforming equipment, especially industrial and commercial scale thermoforming equipment. For example, the incorporation of high molecular weight polymer molecules into propylene polymer resins may result in melt flow rates of about 1 g/10 min, which, even with broad molecular weight distributions and shear-thinning thixotropic properties, does not allow for melt processing at commercial rates. This is so because thermoforming operations often require a minimum melt extrusion rate to produce the propylene polymer sheets and films to be formed.

Propylene polymer resins with high isotacticity also exhibit improved resistance to thermoforming sag. Isotactic propylene polymer resins are generally highly crystalline polymers characterized by the stereoregularity of the polymer chain. The structure of isotactic propylene polymer resins is characterized in terms of the methyl group attached to the tertiary carbon atoms of the successive propylene monomer units lying on the same side of the plane of the main carbon-carbon chain of the polymer. That is, the methyl groups are characterized as being located above or below the plane of the polymer chain. Meso pentad content is a measure of isotacticity.

In contrast to isotactic structure, syndiotactic propylene polymer molecules are those in which the methyl groups attached to the tertiary carbon atoms of successive monomeric units in the polymer chain lie on alternate sides of the plane of the polymer. Syndiotactic polymers are semi-crystalline and, like the crystalline isotactic polymers, are insoluble in xylene solvent. The crystallinity and semi-crystallinity distinguishes both syndiotactic and isotactic polymers from an atactic polymer, which is non-crystalline and highly soluble in xylene solvent. An atactic polymer exhibits no regular order of repeating unit configurations in the polymer chain and forms an amorphous product.

Sag may be reduced at a given processing temperature by providing a polymer resin with higher crystallinity. However, polymer resins with high crystallinity may require higher processing temperatures and greater force to process the polymer resin and form articles. Thus, polymers resins with high crystallinity have been limited to narrow process windows, which is a disadvantage. The inventive propylene polymer resin disclosed in this specification, however, provides the advantage of a combination of high crystallinity and higher material strength but with reduced forming forces that are lower than the forming forces required by typical highly crystalline polymers.

More specifically, while propylene polymer resins with high isotacticity and crystallinity may improve resistance to thermoforming sag by increasing the stiffness of sheets or films comprising such resins, these properties can also increase the temperatures and vacuum draw force necessary to effectively thermoform a sheet or film of the material. This may undesirably narrow the processing conditions under which such resins can be melted, extruded, and/or thermoformed.

The various embodiments described in this specification provide compositions, sheets, and films that comprise a propylene polymer resin that exhibits increased resistance to thermoforming sag while simultaneously maintaining good melt processability and industrial/commercial thermoforming capability. The propylene polymer resin possesses a combination of high crystallinity, broad molecular weight distribution, and high isotacticity, which provide for improved resistance to thermoforming sag. The propylene polymer resin also possesses shear-thinning thixotropic properties that provide for melt processability and extrusion efficiency. The propylene polymer resin demonstrates unexpected synergy among features including the high crystallinity, broad molecular weight distribution, high isotacticity, and thixotropic behavior, which combine to provide outstanding sag resistance without requiring increased thermoforming vacuum draw force or other processing force.

In one embodiment, the propylene polymer resin may be extruded into a sheet having a width of at least 58 cm and a thickness of at least 0.047 inches. The sheet exhibits a sag per unit area less than or equal to 0.42 inches sag/1 inch squared when secured in a horizontal orientation and heated to a temperature of at least 300° C.

In another embodiment, the propylene polymer resin may be extruded into a sheet having width of at least 58 cm and thickness of at least 0.055 inches. The sheet exhibits a sag per unit area less than or equal to 0.42 inches sag/1 inch squared when secured in a horizontal orientation and heated to a temperature of at least 295° C.

In another embodiment, the propylene polymer resin may be extruded into a sheet having width of at least 58 cm and thickness of at least 0.073 inches. The sheet exhibits a sag per unit area less than or equal to 0.42 inches sag/1 inch squared when secured in a horizontal orientation and heated to a temperature of at least 295° C.

The propylene polymer resin may be characterized by excellent melt processability measured as a melt flow rate of greater than or equal to 0.4 g/10 min or, in various embodiments, greater than or equal to 0.50 g/10 min, 1.00 g/10 min, 2.25 g/10 min, 2.50 g/10 min, 2.75 g/10 min, 3.00 g/10 min, 3.25 g/10 min, 3.50 g/10 min, 3.75 g/10 min, 4.00 g/10 min, 4.25 g/10 min, 4.50 g/10 min, 4.75 g/10 min, 5.00 g/10 min, or 6 g/10 min.

The propylene polymer resin may be characterized by high isotacticity measured as a meso pentad content (% mmmm) greater than or equal to 93.5% from 13C-NMR spectra according to the methods described in Zambelli et al., *Macromolecules,* 6, 925 (1973) and Zambelli et al., *Macromolecules,* 8, 687 (1975). In various embodiments, the propylene polymer resin may be characterized by a meso pentad content greater than or equal to 93.5%, 94.0%, 94.5%, 95.0%, 95.5%, 96.0%, 96.5%, 97.0%, 97.5%, or 98.0%.

The propylene polymer resin may be characterized by moderately high xylene soluble content, measured as xylene solubles of greater than or equal to 2.0% in accordance with ASTM D5492-10. In various embodiments, the propylene polymer resin may be characterized by xylene solubles of greater than or equal to 2%, 3%, 4%, 5%, or 6%. To determine xylene solubles, the polymer resin is dissolved in boiling xylene and then the solution cooled to 25° C., which results in the precipitation of the crystalline portion of the resin. The xylene solubles are the portion of the original amount remaining soluble in the cold xylene.

The propylene polymer resin may be characterized by a broad molecular weight distribution measured as $M_w/M_n$, $M_z/M_n$, and/or $M_z/M_w$ using methods such as high-temperature size exclusion chromatography (HSEC). The propylene polymer resin may be characterized by $M_w/M_n$ values greater than or equal to 5.5, or in various embodiments, greater than or equal to 6.0, 6.5, 7.0, 7.5, 8.0, or 9.0. The propylene polymer resin may be characterized by $M_z/M_n$ values greater than or equal to 15, or in various embodiments, greater than or equal to 20, 25, 30, or 35. The propylene polymer resin may be characterized by $M_z/M_w$ values greater than or equal to 3.5, or in various embodiments, greater than or equal to 4.0, 4.1, 4.2, 4.3, 4.5, or 5.0.

The propylene polymer resin may be characterized by Cross model parameters (K, n, and $\eta_o$) determined from dynamic viscosity measurements. The Cross model for shear thinning (M. M. Cross, "Rheology of non-Newtonian fluids: a new flow equation for pseudoplastic systems," *J. Colloid Sci.* 20, 417-437 (1965), incorporated by reference into this specification) relates dynamic viscosity ($\eta$) and frequency ($\omega$) data measured using a parallel plate viscometer in an oscillation test, for example, ASTM D4440-08: Standard Test Method for Plastics: Dynamic Mechanical Properties Melt Rheology, incorporated by reference into this specification. An oscillation test is conducted at a preset temperature and strain percentage, and a sinusoidal strain of increasing frequency ($\omega$) is applied to a melt sample and the induced dynamic viscosity ($\eta$) is measured as a function of frequency. The measured parameters ($\eta$ and $\omega$) are fit to the Cross model equation:

$$\frac{\eta}{\eta_0} = \frac{1}{1 + (K\omega^{1-n})}$$

In the Cross model equation, $\eta_o$ is viscosity at zero shear (determined by extrapolation to zero frequency), and the values of K and n are constant parameters determined by fitting the data. The parameters K (seconds) and n (dimensionless) in the Cross model describe shear thinning material behavior. The critical frequency for the onset of shear thinning is 1/K ($s^{-1}$), and the degree of shear thinning is given by (1−n). As (1−n) approaches zero, the behavior is Newtonian (viscosity independent of shear rate). As (1−n) approaches one, the material exhibits more shear thinning (stronger response of viscosity to shear rate). In general, as melt flow rate increases, shear thinning behavior decreases, and the onset frequency for shear thinning increases.

The propylene polymer resin may be characterized by Cross model parameters (K, n, and $\eta_o$) determined from dynamic viscosity measurements made in accordance with ASTM D4440-08 and at 200° C. and 5% strain. For example, the propylene polymer resin may be characterized by K values greater than or equal to 1.0 seconds, or in various embodiments, greater than or equal to 1.2, 1.5, 1.7, 1.9, or 2.0 seconds (i.e., 1/K values less than or equal to 1.0 $s^{-1}$, or in various embodiments, less than or equal to 0.83, 0.67, 0.59, 0.53, or 0.50 $s^{-1}$. The propylene polymer resin may be characterized by 1/K values less than or equal to 1.0 $s^{-1}$, or in various embodiments, less than or equal to 0.80, 0.75, 0.70, 0.65, 0.60, or 0.55 $s^{-1}$. The propylene polymer resin may be characterized by n values less than or equal to 0.35, or in various embodiments, less than or equal to 0.30 or 0.25. The propylene polymer resin may be characterized by $\eta_o$ (eta$_o$) values greater than or equal to 10,000 Pa-s, or in various embodiments, greater than or equal to 10,500; 20,000; 25,000; or 30,000 Pa-s.

The propylene polymer resin may be characterized by a melt strength at 190° C. greater than or equal to 15 cN, or in various embodiments, greater than or equal to 20, 25, 35, 50, 75, 90, 100, or 115 cN. Melt strength is a property of a polymer melt which indicates the polymer melt's ability to withstand drawing force without breaking. Melt strength can be measured, for example, using a Gottfert Rheotens rheometer and melt strength tester.

The propylene polymer resin may be characterized by any combination of the above-described material properties and characterizing parameters, including any combination or sub-combination of melt flow rate 0.4 g/10 min.), meso pentad content (≥93.5% mmmm), xylene soluble content 2.0%), $M_w/M_n$ (≥5.5), $M_z/M_n$ (≥20), $M_z/M_w$ (≥3.5), Cross model K values (≥1.0), Cross model 1/K values (≤1.0), Cross model n values (≤0.35), Cross model $\eta_o$ values (≥10,000 Pa-s) (wherein the Cross model parameters are determined from measurements at 200° C. and 5% strain), and melt strength at 190° C. (≥15 cN). The propylene polymer resin may be characterized by any combination or sub-combination of the above-described material properties and characterizing parameters at the specified threshold values or any greater or lesser threshold values, as applicable.

In various embodiments, the propylene polymer resin may comprise a linear polypropylene homopolymer. In various embodiments, the propylene polymer resin may comprise a propylene/α-olefin copolymer, alone or in combination with a linear polypropylene homopolymer. For example, in various embodiments, the propylene polymer resin may be derived from propylene monomers and optionally from about 0.0 to 6.0 mol percent of one or more α-olefins other than propylene, such as ethylene, 1-butene, 1-pentene, 1-hexene, 1-heptene, 1-octene, 1-nonene, 1-decene, 1-undecene, and/or 1-dodecene. In embodiments wherein the propylene polymer resin comprises two or more types of polymers (e.g., a linear polypropylene homopolymer and a propylene/α-olefin copolymer), the resins may be produced by melt compounding the individual polymer components. Alternatively, according to various embodiments, the resins comprising two or more types of polymers may be made using an in-reactor process, which may be accomplished by polymerizing the monomer(s) (propylene, for example) of a first polymer component in a first reactor in the presence of a polymerization catalyst and transferring the resulting polymer component from the first reactor into a second reactor (or changing the feed to a single reactor in a batch-type process, for example) where the monomers comprising a second polymer component are polymerized in the presence of the first polymer component.

The propylene polymer resin obtained from a production reactor or reactors may be blended with various other components including other polymers. A variety of additives may be incorporated into the propylene polymer resin for various purposes. Such additives include, for example, stabilizers, antioxidants (for example hindered phenols such as Irganox™ 1010 from the BASF Corporation), phosphites (for example Irgafos™ 168 from the BASF Corporation), cling additives (for example polyisobutylene), polymeric processing aids (such as Dynamar™ 5911 from 3M Corporation or Silquest™ PA-1 from Momentive Performance Materials), fillers, colorants, clarifiers (for example, Millad 3988i and Millad NX8000 from Milliken & Co.), antiblock agents, acid scavengers, waxes, antimicrobials, UV stabilizers, nucleating agents (for example NA-11 from Amfine Corporation), optical brighteners, and antistatic agents. Additives such as stabilizing additives and heat transfer additives may be blended with the propylene polymer resin by co-extrusion, for example.

In various embodiments, the propylene polymer resin may be compounded or otherwise blended with various other components and additives for the production of compounded plastic materials. Compounded polypropylene plastic materials comprising the propylene polymer resin described in this specification may be used in various applications such as, for example, injection molding of automotive parts.

The propylene polymer resin (with or without additives) may also be used for the production of extruded sheets or films such as, for example, biaxially oriented polypropylene (BOPP) sheets or films. Biaxially oriented polypropylene sheets or films comprising the propylene polymer resin described in this specification may be made by extruding the resin or co-extruding the resin with other components and/or additives and stretching the extruded sheet/film in both the machine direction and cross machine direction. Biaxially oriented polypropylene sheets or films may be used in various applications such as, for example, as a packaging material for packaging products such as foods.

Generally, a BOPP film may be provided with increased tensile strength by using a polymer resin with higher crystallinity. However, polymer resins with high crystallinity require greater force to stretch the material and to form a film at a given processing temperature. Typically, high crystallinity polymer resins must be processed at higher stretching temperatures to overcome this limitation. Thus, polymer resins with high crystallinity have been limited to process equipment that can either operate at high temperature or provide high stretching forces at lower (standard) temperatures. The inventive propylene polymer resins described in this specification provide the advantage of higher tensile strength at lower stretch temperatures than exhibited by typical high crystalline polypropylene resins.

The propylene polymer resin (with or without additives) may also be used for the production of extruded sheets or films such as, for example, blown films. Blown films comprising the propylene polymer resin described in this specification may be made by extruding the resin or co-extruding the resin with other components and/or additives and stretching the extruded sheet/film while expanding vertically using a column of chilled air. Blown films may be used in various applications such as, for example, as a packaging material for packaging products such as foods.

The propylene polymer resin (with or without additives) may also be used for the production of thermoformed articles such as, for example, cups, containers, packaging forms, automotive components, and medical devices.

Thermoformed articles made with the propylene polymer resin may be characterized by high stiffness and strength. For example, the propylene polymer resin may be used to produce a thermoformed cup characterized by a top load capacity greater than or equal to (i.e., at least) 551.6 kilopascals (80.0 pounds-per-square inch). Top load strength is the amount of compressive force that a formed article can withstand without collapsing when constrained between two plates in a standard physical testing instrument, such as those available from Instron and MTS.

In various embodiments, a thermoforming process comprises extruding a sheet comprising the propylene polymer resin and thermoforming the extruded sheet into the shape of an article. Thermoforming of relatively thin-gauge products comprises either feeding propylene polymer resin sheet from a roll or directly from a slit die extruder into a thermoforming apparatus comprising a vacuum mold. A propylene polymer resin sheet may be heated to a forming temperature and positioned in a forming station comprising a vacuum mold. A pressure-box closes on the heated sheet and a vacuum may be applied to remove trapped air and to draw the heated sheet onto or into the mold to form the propylene polymer resin to the detailed shape of the mold. After the forming cycle, a burst of reverse air pressure may be actuated from the vacuum side of the mold to break the vacuum and assist the formed article off of, or out of, the mold (i.e., an air-eject). The thermoformed sheet comprising the formed articles may be indexed to a trim station on the same or a different machine, where a blade or die cuts the parts from the remaining sheet web.

The propylene polymer resin extruded into sheet may have a melt flow rate greater than or equal to 1.0 grams per 10 minutes, $M_w/M_n$ greater than 5.5, $M_z/M_n$ greater than 20, a critical frequency for onset of shear-thinning, $1/K$, less than $1.2 \text{ s}^{-1}$ where K is a Cross model constant, a melt strength greater than 15 cN at 190° C., xylene soluble content greater than 2, and mesopentad content in the xylene-insoluble fraction greater than 93.5% mmmm. The sheet may be heated to a temperature of at least 290° C. The heated sheet may be positioned above a vacuum mold. A vacuum pressure (i.e., thermoforming draw force) of 2,241.0 kilopascals (325.0 pounds-per-square inch) or less may be applied to the sheet to draw the sheet into the mold, thereby thermoforming an article in the shape of the mold. In various embodiments, the heated sheet may be drawn to thermoform an article with a vacuum pressure of less than or equal to 2,068.4 KPa (300.0 psi), 1,723.7 KPa (250.0 psi), 1,379.0 KPa (200.0 psi), 1,034.2 KPa (150.0 psi), or 689.5 KPa (100.0 psi).

In various embodiments, an extruded sheet comprising a propylene polymer resin and having a width of at least 55 cm and a thickness between 0.04 and 0.85 inches may sag less than 0.43 inches per unit area when supported only at the edges of the sheet and heated to a temperature of at least 290° C. An extruded sheet comprising a propylene polymer resin and having a width of at least 55 cm and a thickness between 0.04 and 0.5 inches may sag less than 0.43 inches per unit area when supported only at the edges of the sheet and heated to a temperature of at least 290° C., and when the sheet is forced into a mold cavity the required forming for may be less than or equal to 3900 psi per inch of sheet thickness.

In various embodiments, an extruded sheet comprising a propylene polymer resin and having a width of at least 55 cm and a thickness between 0.51 and 0.7 inches may sag less than 0.43 inches per unit area when supported only at the edges of the sheet and heated to a temperature of at least 290° C., and when the sheet is forced into a mold cavity the required forming force may be less than or equal to 5100 psi per inch of sheet thickness. In some embodiments, the forming force may be applied to the upper sheet surface. In various embodiments, an extruded sheet comprising a propylene polymer resin and having a width of at least 55 cm and a thickness greater than 0.71 inches may sag less than 0.43 inches per unit area when supported only at the edges of the sheet and heated to a temperature of at least 290° C., and when the sheet is forced into a mold cavity the required forming force may be less than or equal to 4400 psi per inch of sheet thickness. In some embodiments, the forming force may be applied to the upper sheet surface.

The combination of excellent thermoforming sag resistance exhibited by the propylene polymer resin (less than or equal to 5.1 cm (2.0 in)) and the low thermoforming draw force to form sheets comprising the propylene polymer resin (less than or equal to 2,241.0 KPa (325.0 psi)) is a surprising and unexpected result. The achievement of outstanding sag resistance without requiring increased thermoforming draw force is believed to result from an unexpected synergy among features including the high crystallinity, broad molecular weight distribution, high isotacticity, and thixotropic behavior of the propylene polymer resin.

The non-limiting and non-exhaustive examples that follow are intended to further describe various non-limiting and non-exhaustive embodiments without restricting the scope of the embodiments described in this specification.

EXAMPLES

Examples 1-5

A series of four inventive polypropylene homopolymer resins were produced in a pilot plant using a Ziegler Natta catalyst. The resins were melt-blended in a ZSK30 twin-screw extruder with 1500 ppm of anti-oxidant B215 (commercially available from numerous suppliers, including Chemtura,) 750 ppm calcium stearate, and 600 ppm of a nucleating agent, under tradename T1637N, commercially available from Amfine, and 500 ppm glycidyl monostearate, available under the tradename, GMS 40V. The extruder was operated with screw speed 325 rpm and melt temperature of 237° C., as measured by thermocouple in the die.

The extruded resins were tested for dynamic viscosity testing in a parallel plate viscometer, operating at 200° C. with 5% strain as a function of shear rate using an oscillation test. In an oscillation test, a sinusoidal strain of increasing frequency ($\omega$) is applied to a melt sample and the induced dynamic viscosity OD is measured as a function of frequency. An example of such a test is ASTM D4440-08: *Standard Test Method for Plastics: Dynamic Mechanical Properties Melt Rheology*.

The dynamic viscosity ($\eta$) and frequency ($\omega$) data were fit to the Cross model for shear thinning (M. M. Cross, "Rheology of non-Newtonian fluids: a new flow equation for pseudoplastic systems," *J. Colloid Sci.* 20, 417-437 (1965), incorporated by reference into this specification):

$$\frac{\eta}{\eta_0} = \frac{1}{1 + (K\omega^{1-n})}$$

In the Cross model, $\eta_o$ is viscosity at zero shear (determined by extrapolation to zero frequency), and the values of K and n are constant parameters determined by fitting the data. The normalized complex viscosity ($\eta/\eta_o$) was plotted as a function of shear frequency (co) for the series of six (6) polypropylene homopolymer resins. The constant parameters K and n in the Cross model indicate shear thinning behavior. The critical frequency for the onset of shear thinning is $1/K$, and the degree of shear thinning is given by $(1-n)$. As $(1-n)$ approaches zero, the behavior is Newtonian (viscosity independent of shear rate). As $(1-n)$ approaches one, the material exhibits more shear thinning (stronger response of viscosity to shear rate). In general, as melt flow rate increases, shear thinning behavior decreases, and the onset frequency for shear thinning increases.

As shown in Table 1, the inventive propylene polymer resins with melt flow rates similar to the comparative example exhibit shear thinning at much lower frequencies (0.69 versus 1.40 s$^{-1}$). The inventive resin with higher melt flow rate (4.8) also exhibits shear thinning at significantly lower frequency than the comparative example (0.82 s$^{-1}$ versus 1.40 s 1).

TABLE 1

| | MFR | K(s) | 1/K (s$^{-1}$) | n | eta$_o$ (Pa-s) | Mw/Mn | Mz/Mn | Mz/Mw | melt strength @ 190° C., cN | wt % XS | % mmmm, XI |
|---|---|---|---|---|---|---|---|---|---|---|---|
| Example 1 | 1 | 1.7 | 0.59 | 0.27 | 30073 | 7.7 | 32 | 4.1 | 123 | 2.2 | 96.2 |
| Example 2 | 1.3 | 1.6 | 0.62 | 0.28 | 24683 | 7.4 | 31 | 4.2 | 93 | 3.2 | 94.8 |
| Example 3 | 2 | 1.5 | 0.69 | 0.30 | 19645 | 7.6 | 31 | 4.1 | 53 | 2.5 | 96.3 |
| Example 4 | 4.8 | 1.2 | 0.82 | 0.3 | 10645 | 8.3 | 35 | 4.3 | 25 | 2.3 | 96.8 |
| Example 5 (comparative) | 2.2 | 0.72 | 1.4 | 0.31 | 15119 | 4.4 | 13 | 3.0 | 8.5 | 1.5 | 96.6 |

The series of four (4) inventive propylene polymer resins were also tested for melt strength using a Rheotens rheometer available from Goettfert. The polymer pellets were melted and forced through a die at constant temperature. The melt strength was taken up by two draw rolls mounted below the die exit, and the force required to draw the polymer melt strand was measured as a function of draw rate. The force is reported as "melt strength" in units of centi-Newtons (cN) in Table 1. Generally, melt strength typically decreases as polymer MFR increases. The comparative example has melt strength less than 10 cN and MFR 2.2 dg/min. In comparison, the inventive polymers have melt strength much higher compared to the comparative example, even at MFR values up to 4.8 dg/min.

The series of four (4) inventive propylene polymer resins were also tested for molecular weight distribution using high-temperature size exclusion chromatography (HSEC) and for isotacticity by nuclear magnetic resonance (NMR), measured as meso pentad content (% mmmm) of the xylene-insoluble fraction determined according to the methods described in Zambelli et al., *Macromolecules*, 6, 925 (1973) and Zambelli et al., *Macromolecules*, 8, 687 (1975). The results of this testing are reported in Table 1.

As shown in Table 1, the inventive propylene polymer resins have very broad molecular weight distributions, as shown by the higher $M_z/M_n$ and the higher $M_w/M_n$ values than the comparative examples. The inventive polymers also have high isotacticity, as defined by the mesopentad content (% mmmm) of the xylene-insoluble fraction. Typically, propylene polymers with high isotacticity exhibit very low concentrations of xylene-solubles. The inventive polymers have % mmmm, XI greater than 94.5% and xylene soluble contents greater than 2%. The inventive polymer example with % mmmm greater than 96.5% has xylene soluble 2.3%. By comparison, the comparative example polymer with % mmmm greater than 96.5%, commercially available from Braskem under tradename F020HC2, has xylene soluble 1.5.

Examples 6-17

The inventive polymer resins were extruded through a sheet die to form sheets 58 cm wide. The sheets were conveyed over a roll stack, then supported at the edges by rails and advanced through a convection oven to heat the sheets to temperatures suitable for thermoforming (forming). Upon exiting the oven, the heated sheets were advanced to a forming station in which downward force was applied by resin-coated tups attached to servo motors. One of the tups was fitted with a force transducer and location sensor. The downward force deformed the heated sheets and forced them into molds, providing formed cups. During forming, and after the initial downward force was applied, a small amount of vacuum pressure was applied in the molds to remove air that would otherwise be trapped in the molds and to ensure that the formed articles took the detailed shapes of the molds.

Sheet temperatures were measured by an infrared sensor mounted about the sheet between the oven exit and the forming station. Sheet temperatures are reported in Table 2. The upper oven temperature reported in Table 2 is a set temperature value, maintained by electronic controller in the thermoformer, which adjusts heaters inside of the oven based on thermocouple feedback loops.

Sheet sag is defined as the difference in height between the supported sheet edges and the center of the sheet. As noted above, sheet sag may be a problem in thermoforming processes. When sheets are heated to temperatures suitable for forming, they can sag at the center. This may create a problem because a sheet has the potential to sag against and contact the heating elements in the oven, which may ignite the sheet material.

The heights at the centers of the sheets were measured by a Doppler sensor suspended directly above the sheets between the oven exit and the forming station. The differences in height between the fixed edge height of the sheets and the measured heights of the sheet centers are reported as sag in Table 2. The amount of sag depends on the sheet temperature, the sheet width, and the sheet thickness. Therefore, sag per unit area is used to compare among different extruded sheets. The sag per unit area is defined as sag in inches divided by the product of sheet thickness and the width of the sheet as it is extruded from the die.

The peak forming force reported in Table 2 is defined as the amount of force required to deform the sheet and press it into the mold. Forming force is measured by transducer mounted inside of the tup that contacts and deforms the sheet in the forming station. The maximum force exerted is referred to as the peak force.

The articles formed in Examples 6-17 were cups, such as those used for beverage or food service containers. Cup top load is the amount of compressive force that the formed cups can withstand without collapsing when constrained between two plates in a standard physical testing instrument, such as those available from Instron and MTS.

As shown in Table 2, the inventive polymers exhibit significantly lower sag per unit area than the comparative examples, which include the comparative polymer resin of Example 5 as well as a commercially available polypropylene, FT021N, available from Braskem. As noted above, sag may be reduced at a given processing temperature by providing a polymer resin with higher crystallinity. However, polymer resins with high crystallinity may require higher processing temperatures and greater force to process the polymer resins and form articles. Thus, polymer resins with high crystallinity have been limited to narrow process windows, which is a disadvantage. The inventive propylene polymer resin disclosed in this specification, however, provides the advantage of a combination of high crystallinity and higher material strength but with reduced forming forces that are lower than the forming forces required by typical highly crystalline polymers.

TABLE 2

| | sheet composition | sheet thickness (in) | sheet T for forming (° C.) | upper oven T (° C.) | sag (in) | sag/unit area (1/inches) | peak forming force (psi) | peak forming force/sheet thickness (psi/in) | cup top load (lbf) |
|---|---|---|---|---|---|---|---|---|---|
| Example 7 | the polymer resin of Ex 1 | 0.047 | 315 | 359 | 0.21 | 0.20 | 180 | 3830 | 68 |
| Example 8 | the polymer resin of Ex2 | 0.047 | 304 | 357 | 0.45 | 0.42 | 175 | 3723 | 56 |
| Example 9 (comparative) | the polymer resin of Ex 5 | 0.047 | 297 | 357 | 0.64 | 0.60 | 200 | 4255 | 68 |
| Example 10 (comparative) | commercially available FT021N | 0.047 | 306 | 352 | 0.83 | 0.77 | 179 | 3809 | 59 |
| Example 11 | the polymer resin of Ex 3 | 0.055 | 299 | 360 | 0.48 | 0.38 | 270 | 4909 | 30 |
| Example 12 | the polymer resin of Ex 4 | 0.055 | 299 | 357 | 0.5 | 0.40 | 280 | 5091 | 33.6 |
| Example 13 (comparative) | the polymer resin of Ex 5 | 0.055 | 301 | 355 | 0.56 | 0.45 | 290 | 5273 | 33.7 |

TABLE 2-continued

| | sheet composition | sheet thickness (in) | sheet T for forming (° C.) | upper oven T (° C.) | sag (in) | sag/unit area (1/inches) | peak forming force (psi) | peak forming force/sheet thickness (psi/in) | cup top load (lbf) |
|---|---|---|---|---|---|---|---|---|---|
| Example 14 (comparative) | commercially available FT021N | 0.055 | 298 | 350 | 1.2 | 0.96 | 291 | 5291 | 28 |
| Example 15 | the polymer resin of Ex 4 | 0.073 | 298 | 371 | 0.7 | 0.42 | 319 | 4370 | 79 |
| Example 16 (comparative) | the polymer resin of Ex 5 | 0.073 | 304 | 373 | 0.8 | 0.48 | 335 | 4589 | 71 |
| Example 17 (comparative) | commercially available FT021N | 0.073 | 292 | 361 | 1.5 | 0.90 | 333 | 4562 | 68 |

Examples 18-20

The inventive polymer resins were taken as powders directly from the reactor, then extruded with stabilizing additives to form pellets. In addition, two commercially available grades were tested. One grade is F020HC2, which is commercially available from Braskem. This grade was taken as powder directly from the polymerization process prior to extrusion and extruded in a lab extruder with stabilizing additives. The other grade name is FF025A, which is commercially available from Braskem, and has a high content of xylene solubles and is designed for ease of stretching in BOPP processes. The pellets were fed to a single-screw extruder, melted and conveyed through a slit die mounted above a chilled roll to provide a cast film with thickness 0.020 inches. Test samples having length two inches and width two inches were cut from the cast films using a hand-operated press fitted with a cutting die.

The test samples were then clamped in the oven of a TMLong film stretching instrument, equilibrated to oven temperature, and stretched biaxially to form films with length 12 inches, width 12 inches, and thickness ranging from 0.7 to 0.8 thousands of an inch. Stretching oven temperatures were set to 280° F., 290° F., and 300° F. During the simultaneous, biaxial stretch, pressure transducers mounted in the clips that held the films measured the force required to stretch at constant strain rate. The force measured at each oven set temperature at the yield point of the film is reported in Table 3 as yield stress in units of psi. The MD (machine direction) yield stress is defined as the force required to stretch the film in the direction that coincides with the length of the cast roll when the cast film was produced. The TD (transverse direction) yield stress is defined as the force required to stretch the film in the direction perpendicular to the cast roll. An optimal stretch temperature may be defined by fitting at least three yield point values (y values) and their corresponding oven temperatures (x values) to a line, then interpolating to calculate the oven temperature that would provide a yield stress of 350 psi. The optimal MD stretch temperatures and optimal TD stretch temperatures are reported in Table 3. They have been calculated using the yield stress values also reported in Table 3.

The biaxially stretched films that were produced using the inventive polymers were tested for tensile strength using standard ASTM methods, such as ASTM D882-12. The peak stress is reported in Table 3.

As demonstrated by the examples, the inventive resin provides lower optimal MD and TD stretch temperatures than comparative example 19 while providing comparable film strength, reported as peak stress in film tensile test. The inventive resin provides significantly greater strength than the standard BOPP grade, FF025A.

As noted above, a BOPP film may be provided with increased tensile strength by using a polymer resin with higher crystallinity. However, polymer resins with high crystallinity require greater force to stretch the polymer resin and to form a film at a given processing temperature. Typically, high crystallinity polymer resins must be processed at higher stretching temperatures to overcome this limitation. Thus, polymer resins with high crystallinity have been limited to process equipment that can either operate at high temperature or provide high stretching forces at lower (standard) temperatures. The inventive propylene polymer resin described in this specification provide the advantage of high crystallinity and higher tensile strength at lower stretch temperatures than exhibited by typical high crystallinity polypropylene resins.

TABLE 3

| | | MD yield stress | | | TD yield stress | | | | | | peak stress |
|---|---|---|---|---|---|---|---|---|---|---|---|
| | | yield stress (psi) @ $T_{oven}$ 280° F. | yield stress (psi) @ $T_{oven}$ 290° F. | yield stress (psi) @ $T_{oven}$ 300° F. | yield stress (psi) @ $T_{oven}$ 280° F. | yield stress (psi) @ $T_{oven}$ 290° F. | yield stress (psi) @ $T_{oven}$ 300° F. | optimal MD stretch temp (° F.) | optimal TD stretch temp (° F.) | stretched film thickness (in) | in film tensile test (psi) |
| Example 18 | the polymer resin of Ex. 3 | 520 | 416 | 300 | 597 | 476 | 345 | 295.6 | 299.7 | 0.00073 | 31802 |
| Example 19 (comparative) | the polymer resin of Ex. 5 | 551 | 467 | 322 | 582 | 530 | 389 | 298.2 | 304.5 | 0.00076 | 33320 |

TABLE 3-continued

| | | MD yield stress | | | TD yield stress | | | optimal MD stretch temp (° F.) | optimal TD stretch temp (° F.) | stretched film thickness (in) | peak stress in film tensile test (psi) |
|---|---|---|---|---|---|---|---|---|---|---|---|
| | | yield stress (psi) @ $T_{oven}$ 280° F. | yield stress (psi) @ $T_{oven}$ 290° F. | yield stress (psi) @ $T_{oven}$ 300° F. | yield stress (psi) @, $T_{oven}$ 280° F. | yield stress (psi) @ $T_{oven}$ 290° F. | yield stress (psi) @ $T_{oven}$ 300° F. | | | | |
| Example 20 (comparative) | commercially available FF025A | 374 | 288 | 179 | 422 | 346 | 231 | 282.9 | 288.2 | 0.00081 | 30492 |

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, step sequences, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112, first paragraph, and 35 U.S.C. § 132(a).

What is claimed is:

1. A method of making a thermoformed article, comprising:
   extruding a sheet comprising a propylene homopolymer resin having:
   a. a melt flow rate greater than 0.4 grams per 10 minutes, measured according to ASTM D1238 (230° C., 2.16 kg);
   b. a $M_w/M_n$ greater than 5.5, a $M_z/M_n$ greater than 20, and a $M_z/M_w$ greater than or equal to 4.0;
   c. a critical frequency for onset of shear-thinning, 1/K, less than 1.2 s$^{-1}$, where K is a Cross model constant;
   d. a melt strength greater than 15 cN at 190° C.;
   e. a xylene soluble content greater than or equal to 2%, measured according to ASTM D5492;
   f. a mesopentad content in the xylene-insoluble fraction greater than 96.0%; and
   g. a temperature suitable for forming of at least 290° C., to form an extruded sheet, and
   thermoforming the extruded sheet into the shape of an article to form a thermoformed article.

2. The method of claim 1, wherein the extruded sheet has a width of at least 55 cm and a thickness between 0.04 and 0.85 inches, which upon heating to the temperature suitable for thermoforming, exhibits sag per unit area of less than 0.43 inches$^{-1}$ when supported only at the edges of the sheet.

3. The method of claim 1, wherein the extruded sheet has a width at least 55 cm and a thickness between 0.04 and 0.5 inches, which upon heating to the temperature suitable for thermoforming, sags less than 0.43 inches per unit area when supported only at the edges of the sheet, wherein the sheet, when forced into a mold cavity, requires less than or equal to 3900 psi forming force per inch of sheet thickness.

4. The method of claim 1, wherein the extruded sheet has a width at least 55 cm and a thickness between 0.51 and 0.7 inches, which upon heating to the temperature suitable for forming, sags less than 0.43 inches per unit area when supported only at the edges of the sheet, wherein the sheet, when forced into a mold cavity, requires less than or equal to 5100 psi forming force per inch of sheet thickness, wherein the force is applied to an upper surface of the sheet.

5. The method of claim 1, wherein the extruded sheet has a width at least 55 cm and a thickness greater than 0.71 inches, which upon heating to the temperature suitable for forming, sags less than 0.43 inches per unit area when supported only at the edges of the sheet, wherein the sheet, when forced into a mold cavity, requires less than or equal to 4400 psi forming force per inch of sheet thickness, wherein the force is applied to an upper surface of the sheet.

6. The method of claim 1, wherein the extruded sheet has a melt flow rate greater than 2.25 g/10 min, measured according to ASTM D1238 (230° C., 2.16 kg).

7. The method of claim 1, wherein the extruded sheet has a xylene soluble content from 2% to 3.2%, measured according to ASTM D5492.

8. The method of claim 7, wherein the xylene soluble content ranges from 2.2% to 3.2%, measured according to ASTM D5492.

9. The method of claim 7, wherein the xylene soluble content ranges from 3% to 3.2%, measured according to ASTM D5492.

10. The method of claim 1, wherein the extruded sheet exhibits a melt strength/melt flow rate value ranging from 5.2 to 123 cN·min/g,
    wherein the melt strength is measured at 190° C., and
    wherein the melt flow rate value is measured according to ASTM D1238 (230° C., 2.16 kg).

11. The method of claim 1, wherein the extruded sheet has a critical frequency for onset of shear-thinning, 1/K, of less than or equal to 1.0 s$^{-1}$, where K is a Cross model constant.

12. The method of claim 1, wherein the extruded sheet is a biaxially oriented polypropylene (BOPP) sheet or blown film.

13. The method of claim 1, wherein the extruding step comprises extruding the propylene homopolymer resin with one or more additional components in a co-extrusion process.

14. The method of claim 13, wherein the additional components comprise additives.

15. The method of claim 1, further comprising, after the step of forming the extruded sheet, a step of stretching the extruded sheet.

16. The method of claim 15, wherein the extruded sheet is a biaxially oriented polypropylene (BOPP) sheet, and wherein the step of stretching the extruded sheet is carried out in both the machine direction and cross machine direction.

17. The method of claim 15, wherein the extruded sheet is a blown film, and wherein the step of stretching the extruded sheet is carried out while expanding vertically using a column of chilled air.

18. The method of claim 1, wherein the thermoforming step is carried out at a temperature of at least 290° C.

19. The method of claim 1, wherein the thermoforming step comprises applying a vacuum pressure of 325 psi or less to the sheet to draw the sheet into a thermoformed article.

20. The method of claim 19, wherein the vacuum pressure ranges from 300 psi to 100 psi.

21. The method of claim 1, wherein the thermoformed article is a package, storage container, drinking cup, automotive component, or medical device.

22. The method of claim 1, wherein the thermoformed article has a top load capacity of at least 80 psi.

23. The method of claim 1, wherein the thermoformed article exhibits a sag resistance of less than 2.0 inches.

* * * * *